United States Patent
Yokogawa

(10) Patent No.: US 6,639,617 B2
(45) Date of Patent: Oct. 28, 2003

(54) IMAGE FORMING APPARATUS HAVING A CONTROL UNIT THAT CONTROLS EXPOSURE ENERGY AND RELATED IMAGE FORMING METHOD

(75) Inventor: Tadahiro Yokogawa, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/141,010

(22) Filed: May 6, 2002

(65) Prior Publication Data

US 2002/0168195 A1 Nov. 14, 2002

(30) Foreign Application Priority Data

May 14, 2001 (JP) ........................... 2001-142564

(51) Int. Cl.[7] ............................................. G03G 15/00
(52) U.S. Cl. .................... 347/130; 347/133; 399/51; 399/66
(58) Field of Search ..................... 399/51, 66, 313, 399/46; 347/133, 237, 130

(56) References Cited

U.S. PATENT DOCUMENTS 5,036,360 A * 7/1991 Paxon et al. .................. 399/46
5,151,736 A * 9/1992 Ohzeki et al. ................ 399/66
6,308,023 B1 * 10/2001 Nomura et al. .............. 399/81
6,388,695 B1 * 5/2002 Nagumo ..................... 347/237

FOREIGN PATENT DOCUMENTS

| JP | 02-287380 | | 11/1990 |
| JP | 10-207262 A | * | 8/1998 |
| JP | 11-342649 | | 12/1999 |

* cited by examiner

*Primary Examiner*—Joan Pendegrass
(74) *Attorney, Agent, or Firm*—Hogan & Hartson, LLP

(57) ABSTRACT

An image forming apparatus and an image forming method for preventing reducing of density of an image transferred to the recording paper due to dropping in a temperature, without providing a temperature sensor. The current detecting unit detects an electric current value generated at the time a test voltage is applied to a transferring member which is provided for transferring a developed image on a photoconductive drum to the paper. The detected current value is input and stored by a printer controller. The printer controller determines an exposure time, based on the stored current value, by reference to a table for determining an exposure time. The printer controller causes the exposure time to be long when the stored current value is small or large.

38 Claims, 7 Drawing Sheets

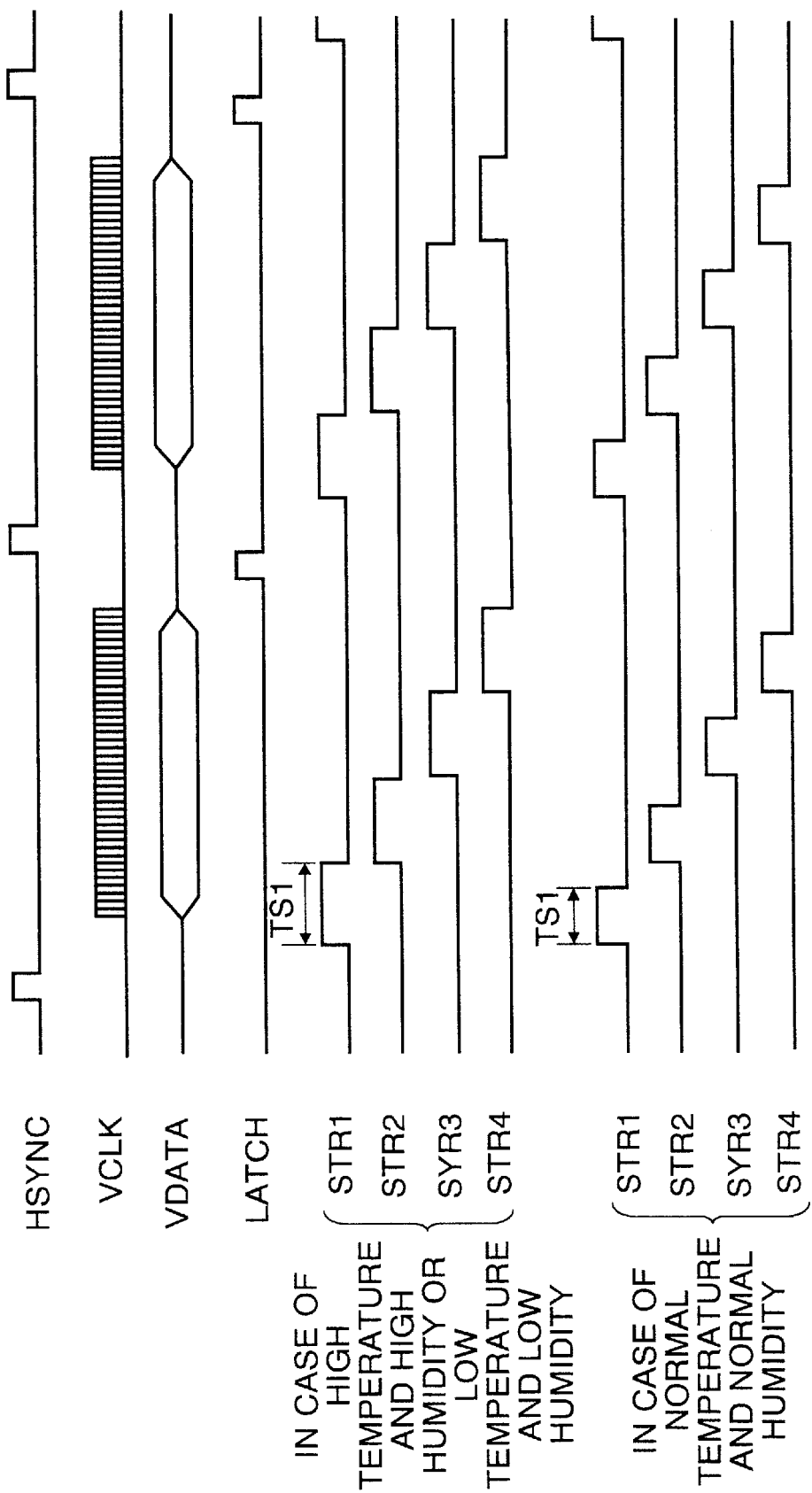

IMAGE FORMING APPARATUS HAVING A CONTROL UNIT THAT CONTROLS EXPOSURE ENERGY AND RELATED IMAGE FORMING METHOD

CROSS REFERENCES TO RELATED APPLICATIONS

This application claims priority under 35 USC 119 of Japanese Patent Application No. 2001-142564 filed in JPO on May 14, 2001, the entire disclosure of which is incorporated herein by reference.

BACKGROUND OF THE INVENTION

1. Field of the Invention

The present invention relates to an electrophotographic image forming apparatus which can be applied to printers and facsimile machines, and relates to an image forming method.

2. Description of the Related Art

The electrophotographic image forming apparatus conventionally employs a reversal development method. According to the reversal development method, an organic photo conductor (OCP) film is formed on a drum functioning as an image bearing body (for, example, a photoconductive body), and a latent image is formed at a part of the photoconductive body which has been exposed to light, and toner is attached to the latent image, thereby forming a developed image. In this kind of image forming apparatus, sensitivity of the organic photo conductor (OPC) film becomes low in the environmental condition where a temperature and humidity are low. Furthermore, in such environmental condition, potential of the electrostatic latent image does not rise sufficiently, the density of the toner image formed on the image bearing body is decreased, and as a result, the density of the image transferred to the recording paper is also decreased. Japanese Patent Application, Laid Open Publication No. 8-171147 discloses an image forming apparatus for controlling the exposure time of the image bearing body based on the environmental temperature detected by a provided temperature sensor.

As described above, the problem that the density of the image transferred to the recording paper is decreased due to a surrounding temperature drop can be relieved by such an image forming apparatus for controlling the exposure time of the image bearing body based on an environmental temperature. However, there is another problem that the temperature sensor must be installed. Meanwhile, in the environmental condition where an temperature and humidity are high, the organic photo conductor is highly sensitive, and the potential of the electrostatic latent image rises sufficiently. However, since the transfer efficiency of the image from the image bearing body to the recording paper is deteriorated at high temperatures and humidity, the density of the image recorded on the recording paper is lowered as a result.

SUMMARY OF THE INVENTION

The present invention was devised in focusing on the above problems, and it is an object of the present invention to provide an image forming apparatus which can prevent decreasing of the density of the image transferred to the recording paper which is caused due to a drop and rise in temperature even if the temperature sensor is not specially provided.

According to one aspect of the present invention, there is provided an image forming apparatus including an exposure unit for exposing an image bearing body to light so as to form an electrostatic latent image on the image bearing body, a developer for developing the electrostatic latent image on the image bearing body, and a transferring member for transferring the image developed on the image bearing body to the paper. This image forming apparatus determines a transfer bias to be applied to the transferring member and exposure energy of the exposure unit based on the current value generated at the time a test voltage is applied to the transferring member.

According to another aspect of the present invention, the image forming apparatus determines the transfer bias to be applied to the transferring member, and controls the exposure energy of the exposure unit, in accordance with the current value which is generated at the time the test voltage is applied to the transferring member. Preferably, the image forming apparatus increases the exposure energy when the current value is low due to a low surrounding temperature, or when the current value is high due to a high surrounding temperature, thereby preventing decreasing of the density of toner image which is transferred to the paper. Furthermore, the image forming apparatus preferably includes a table for determining the exposure energy, based on a value of an electric current generated at the time the test voltage is applied to the transferring member. In addition, the image forming apparatus preferably includes a transfer bias applying unit for applying the transfer bias to the transferring member.

Preferably, the exposure energy is controlled by controlling a period of time for which the exposure is being carried out, or is controlled by controlling intensity of light to be used for exposing the image bearing body.

Additional objects, aspects, benefits and advantages of the present invention will become apparent to those skilled in the art to which the present invention pertains from the subsequent detailed description and the appended claims, taken in conjunction with the accompanying drawings.

BRIEF DESCRIPTION OF THE DRAWINGS

FIG. 7 is a time chart of signals in each part of the LED print head of FIG. 3.

DETAILED DESCRIPTION OF THE INVENTION

Hereinafter, the present invention will be described in more detail with reference to a preferred embodiment of the present invention.

Figure 1:
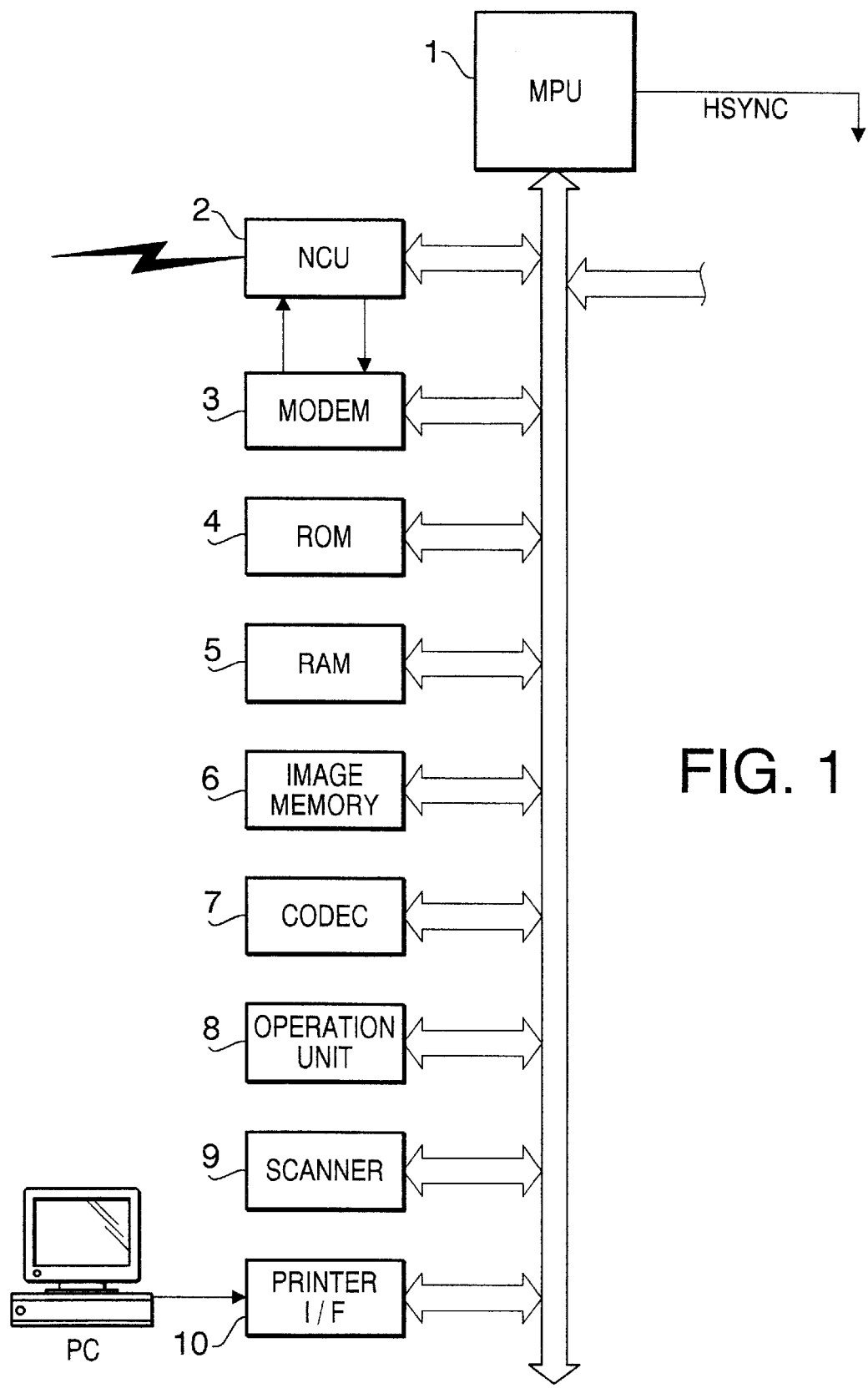
FIG. 1 is a schematic block diagram illustrating structure of a part of an image forming apparatus according to a preferred embodiment of the present invention.
Figure 2:
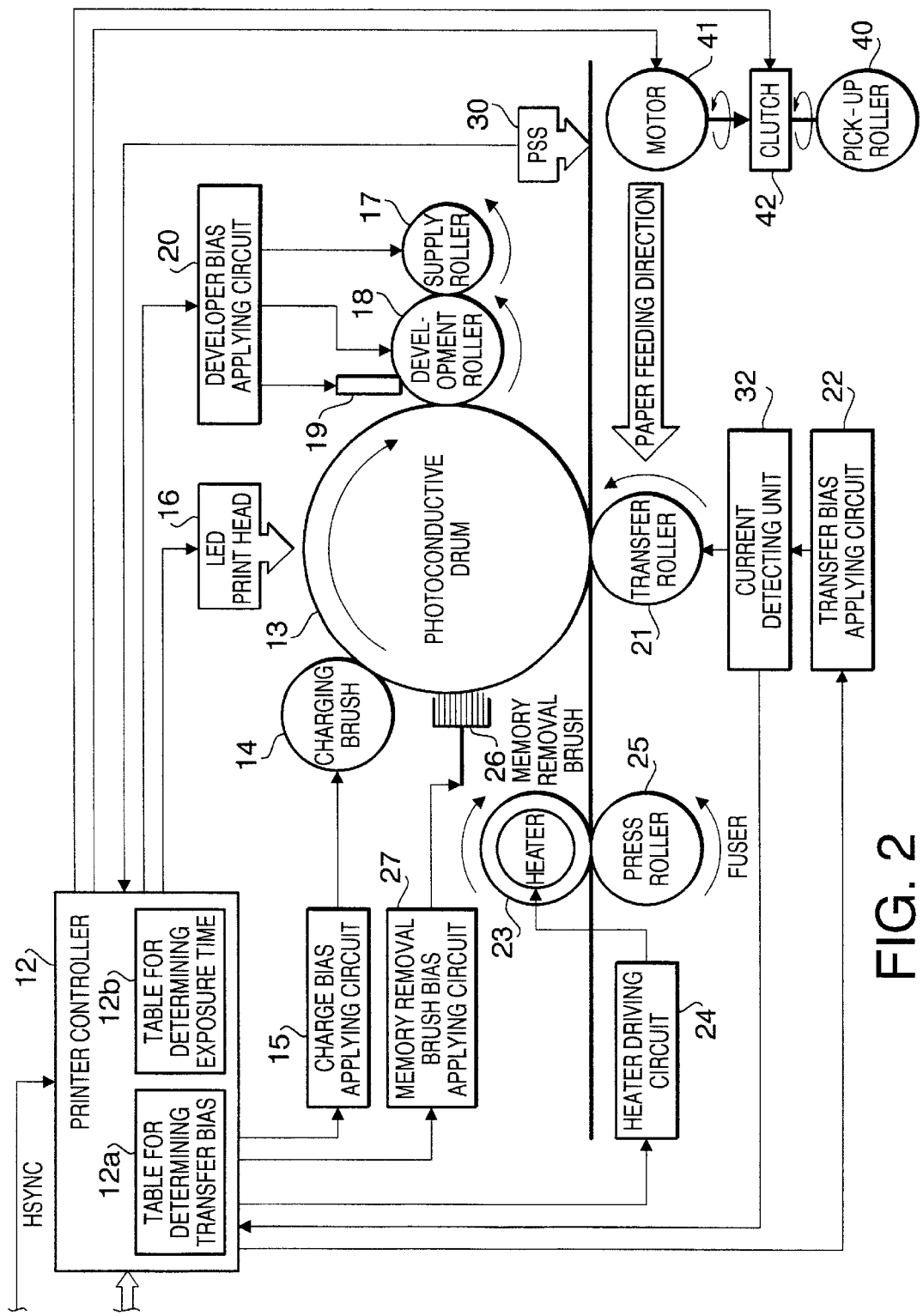
FIG. 2 is a schematic view illustrating structure of another part of the image forming apparatus according to the preferred embodiment of the present invention.

FIG. 1 shows a schematic compositional illustration of a part of an image forming apparatus in the preferred embodiment of the present invention, and FIG. 2 shows a schematic compositional illustration of another part of the image forming apparatus. This image forming apparatus composed as a so-called multifunction machine possessing facsimile and copy functions is provided with an MPU (control unit) 1, an NCU 2, a MODEM 3, a ROM 4, a RAM 5, an image memory (DRAM) 6, a CODEC (Coder and Decoder) 7, an operation unit 8, a scanner 9, and a printer interface 10 as shown in FIG. 1. Moreover, this apparatus is provided with an electrophotographic type printer composed as illustrated in FIG. 2 and a paper handling mechanism for carrying a recording medium (for example, paper) from a paper cassette (not shown in the drawings) to a transfer roller 21 and a press roller 25.

The MPU 1 controls each unit which is an element of this apparatus. The NCU 2 controls connection with a public switched telephone network (PSTN), and possesses a function for transmitting an address signal corresponding to a telephone number (or facsimile number) of the other end and a function for detecting an incoming call. The MODEM 3 modulates transmitting data and demodulates receiving data in accordance with V.17, V.27ter, V.29, etc. based on a facsimile transmission control procedure following the ITU (International Telecommunication Union) -T Recommendation T 30. Alternatively, the MODEM 3 modulates transmitting data, and demodulates receiving data in accordance with V.34 in addition to V.17, V.27ter, V.29, etc.

The ROM 4 memorizes a program for controlling this apparatus. The RAM 5 memorizes data, etc. temporarily. The image memory 6 memorizes received image data and image data read by the scanner 9 temporarily. The CODEC 7 encodes read image data by MH, MR, MMR coding method, or the like to transmit the image data, and decodes received image data. The operation unit 8 is provided for a user to instruct the image forming apparatus to carry out facsimile reception, facsimile transmission, printing, or the like. The scanner 9 reads the image data of a document in transmitting the facsimile. The printer interface 10 receives a printing instruction and data from personal computers, and transmits the received instruction and data to a printer controller 12 which will be described later.

The printer of this apparatus is provided with the printer controller 12 for controlling each unit as shown in FIG. 2. The printer controller 12 includes a table 12a for determining a transfer bias and a table 12b for determining an exposure time. A photoconductive drum 13 having a photo conductor film on the peripheral surface thereof is disposed as a photoconductive body in the printer, and is rotated by a motor 41. A charging brush 14 is disposed as a brush roller type charger at a place around this photoconductive drum 13, and a predetermined bias is applied to this charging brush 14 by a charging bias applying circuit 15. The charging brush 14 to which the bias has been applied charges the peripheral surface of the photoconductive drum 13 such that potential of the peripheral surface of the photoconductive drum 13 uniformly becomes about −800V while the photoconductive drum 13 is rotating.

An LED (light emitting diode) print head 16 which functions as an exposure unit disposed at a place around the photoconductive drum 13 includes a plurality of arranged LEDs, and emits light to the peripheral surface of the photoconductive drum 13, based on input image information, so as to form an electrostatic latent image corresponding to the image information on the peripheral surface. Received facsimile image data, scanned image data, or image data received from the personal computer via the printer interface 10 may be used as the image information.

Further, the developer disposed at a place around the photoconductive drum 13 includes a supply roller 17, a development roller 18, a blade 19, a developer bias applying circuit 20, etc. The supply roller 17 supplies toner from a toner case containing the toner (not shown in the drawings) to the development roller 18 while the supply roller 17 is charging the toner, and a predetermined bias (−700V to −600V) is applied to this supply roller 17 by the developer bias applying circuit 20. The developer bias applying circuit 20 applies a predetermined bias (−400V to −300V, preferably about −350V) to the development roller 18 disposed so as to contact with this supply roller 17 and the photoconductive drum 13.

The developer bias applying circuit 20 applies a predetermined bias (−700V to −600V) to the blade 19. The blade 19 contacts elastically with the peripheral surface of the development roller 18 so as to cause the layer thickness of the toner attached on the peripheral surface of the development roller 18 to be uniform.

The transfer roller 21 functioning as a transfer unit is also disposed at a place around the photoconductive drum 13 so as to contact with the peripheral surface of the photoconductive drum 13 and so as to sandwich a paper feeding path in cooperation with the peripheral surface of the photoconductive drum 13. In addition, the transfer roller 21 is rotated by the motor 41. A transfer bias applying circuit 22 applies a predetermined bias to this transfer roller 21. A current detecting unit 32 is provided between the transfer bias applying circuit 22 and the transfer roller 21, detects an electric current which is generated at the time the transfer bias is applied to the transfer roller 21, and outputs the detected electric current into the printer controller 12.

A fuser disposed on the paper discharging side of the paper feeding path includes a heat roller 23 having a heater such as a halogen lamp, and includes a heater driving circuit 24 and a press roller 25. The heater of the heat roller is controlled by the heater driving circuit 24, and is thereby turned off and on such that a temperature of the peripheral surface of the heat roller 23 becomes a predetermined value. The heat roller 23 and the press roller 25 fix the toner image on the paper by heating and pressuring the paper on which the toner image has been transferred by the transfer roller 21.

A memory removal brush 26 is disposed at a place around the photoconductive drum 13 in this apparatus. This memory removal brush 26 is provided for eliminating the toner image (the memory image) remaining along the image outline on the peripheral surface of the photoconductive drum 13 after the toner image has been transferred to the paper, and a memory removal brush bias applying circuit 27 applies a predetermined bias to the memory removal brush 26.

Moreover, the image forming apparatus includes a paper handling mechanism which is provided for picking up the paper set in the paper feed cassette one by one. In this paper handling mechanism, a pick up roller 40 is connected to the motor 41 via a clutch 42. When the paper is picked up from the paper cassette, the paper in the paper cassette 45 is picked up one by one after the pick up roller 40 is connected to the motor 41 by a clutch 42, and thereby, is rotated.

A PSS (paper supply sensor) 30 is also disposed at the paper supplying side of the paper feeding path in this apparatus, and detects the paper supply.

The following description is directed to the working of the image forming apparatus constructed in the above-described manner. The photoconductive drum 13 is charged uniformly at about −800V by the charge brush 14, and the electrostatic latent image corresponding to the image information is formed on the photoconductive drum 13 by the LED print head 16. The toner is adhered to the electrostatic latent image on the photoconductive drum 13 by the development roller 18 to form the toner image on the photoconductive drum 13, and the toner image on the photoconductive drum 13 is transferred to the paper by the transfer roller 21. After the toner image is transferred to the paper, heat and pressure is applied to the paper by the heat roller 23 and the press roller 25 to fix the toner image as a permanent image on the paper.

Figure 3:
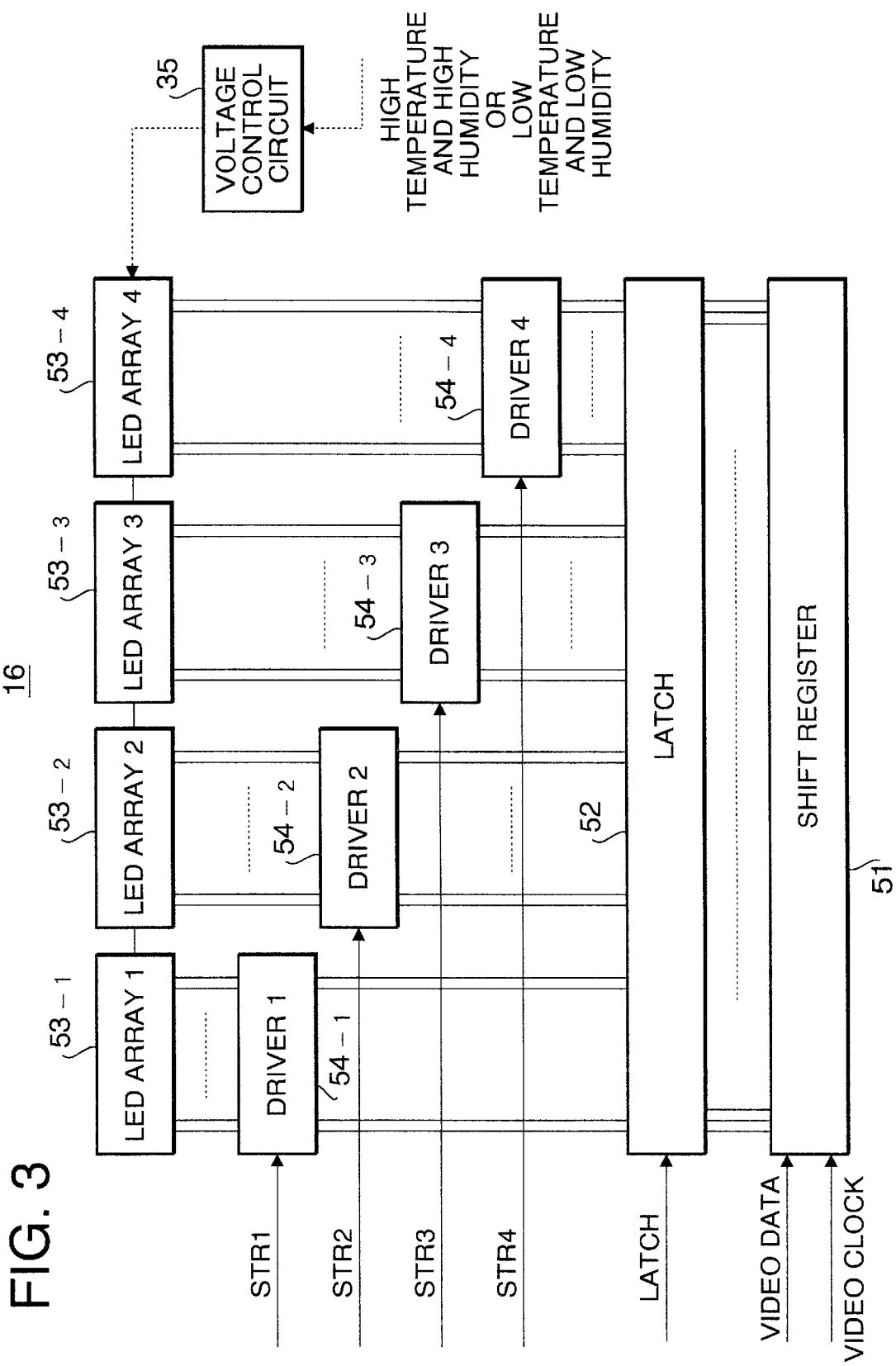
FIG. 3 is a block diagram illustrating circuit composition of an LED print head of the image forming apparatus shown in FIGS. 1 and 2.

FIG. 3 illustrates a circuit composition of the LED print head 16. This LED print head 16 includes a shift register 51 for memorizing serial image data to be printed, a latch circuit 52 for latching respective bit signals of the shift register 51 by latch signals, four LED arrays $53_{-1}$, $53_{-2}$, $53_{-3}$, $53_{-4}$ on which a plurality of LED elements are arranged, and drivers $54_{-1}$, $54_{-2}$, $54_{-3}$, $54_{-4}$ for driving each of these LED arrays $53_{-1}$ to $53_{-4}$ sequentially. Data latched by the latch circuit 52 is input to the drivers $54_{31\ 1}$, $54_{-2}$, $54_{-3}$, $54_{-4}$ such that bits corresponding to each of the drivers are input to each of the driver, respectively. The driver $54_{-1}$ drives the respective LEDs of the LED array $53_{-1}$ in accordance with the input data at the timing when a strobe signal STR1 is received. The drivers $54_{-2}$, $54_{-3}$, $54_{-4}$ also drive the respective LEDs of the LED arrays $53_{-2}$, $53_3$, $53_{-4}$ in accordance with the input data at the timing when the strobe signals STR2, STR3, STR4 are received respectively. The circuit composition of the LED print head 16 as illustrated here is well known.

Figure 4:
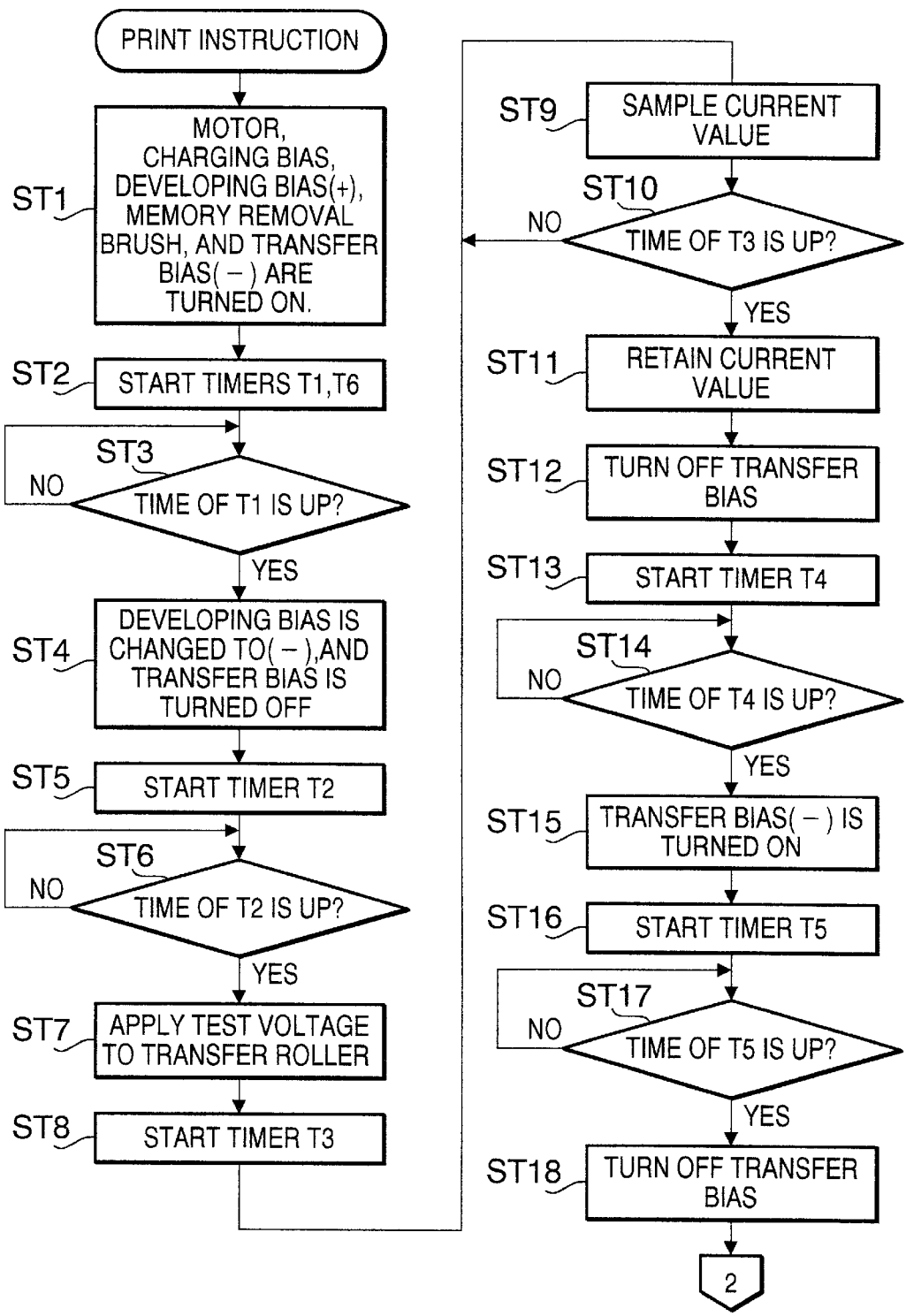
FIG. 4 is a flow chart showing a printing procedure of the image forming apparatus shown in FIGS. 1 and 2;.
Figure 5:
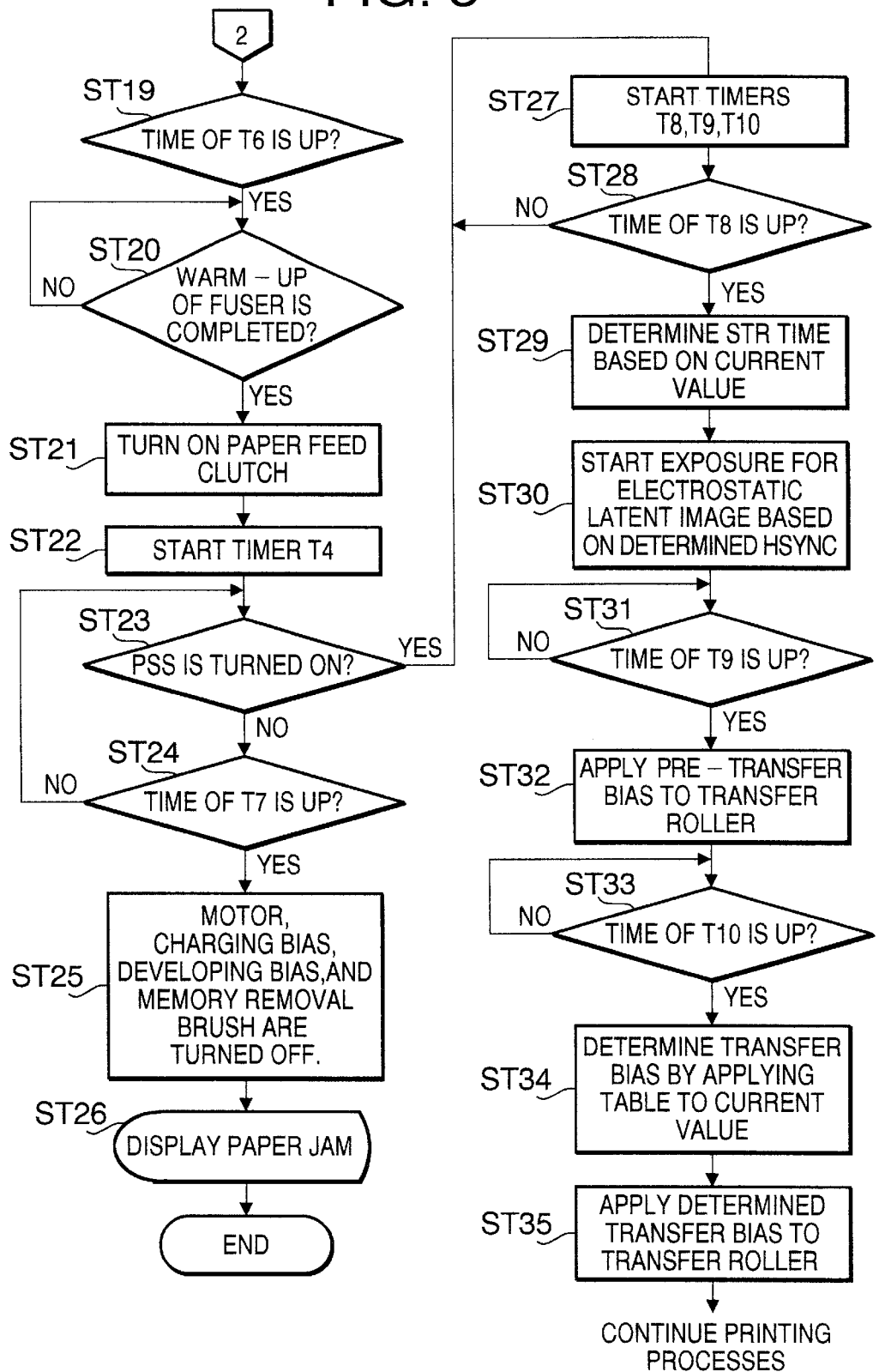
FIG. 5 is a flow chart showing a printing procedure following the printing procedure shown in FIG. 4.
Figure 6:
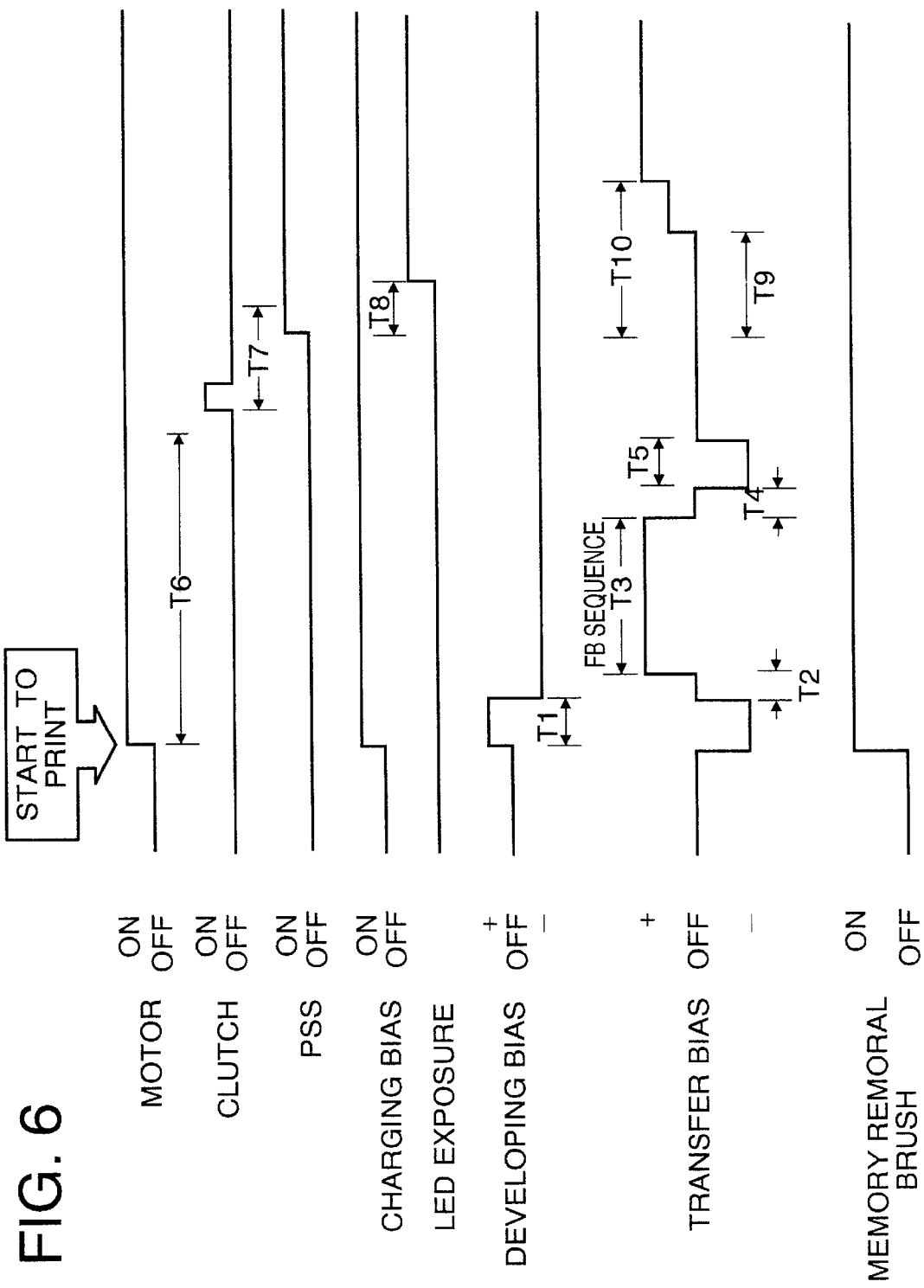
FIG. 6 is a time chart showing the printing processes of the image forming apparatus shown in FIGS. 1 and 2.

Next, the print process working of the image forming apparatus in the preferred embodiment of the present invention will be described with reference to flow charts as illustrated in FIGS. 4 and 5 and a time chart as illustrated in FIG. 6.

When a print instruction is input to the printer controller 12, the motor 41, the developing bias (+), the memory removal brush 26, the transfer bias (−) of the transfer bias applying circuit 22 are turns on. Subsequently, the toner remaining at the part of the photoconductive drum 13 which has not been charged is collected by the development roller 18, and the toner on the transfer roller 21 is caused to move to the photoconductive drum 13 (the cleaning of the transfer roller 21). The printer controller 12 starts a timer $T_1$ and a timer $T_6$ in the step ST2 as shown in FIG. 4, and the procedure proceeds to the step ST3.

In the step ST3, the printer controller 12 determines whether or not time of the timer $T_1$ is up. The timer $T_1$ counts time in order to detect the timing at which the developing bias is changed and the transfer bias is turned off. In other words, when the time of the Timer $T_1$ is up, the procedure proceeds to the step ST4, and in the step ST4, the printer controller 12 changes the developing bias to a minus value (−), and turns off the transfer bias. Subsequently, the procedure proceeds to the step ST5. In the step ST5, the printer controller 12 starts a timer $T_2$, and procedure proceeds to the step ST6.

In the step ST6, the printer controller 12 determines whether or not time of the timer $T_2$ is up. The timer $T_2$ counts time until the time of the timer $T_2$ reaches the timing at which a test voltage is applied to the transfer roller. When the time of timer $T_2$ is up, the procedure proceeds to the step ST7. In the step ST7, the printer controller 12 causes the transfer bias applying circuit 22 to apply a test voltage to the transfer roller, and subsequently, the procedure proceeds to the step ST8. In the step ST8, the printer controller 12 starts a timer $T_3$. This timer $T_3$ is provided for managing a test sequence period of the transfer roller. After the timer $T_3$ is started, the procedure proceeds to the step ST9.

In the step ST9, the current detecting unit 32 carries out sampling of an electric current value so as to detect an electric current value which flows when the test voltage is applied to the transfer roller. Subsequently, the procedure proceeds to the step ST10, and in the step ST10, the printer controller 12 determines whether or not the time of the timer $T_3$ is up. When the time of the timer $T_3$ is up, the procedure proceeds to the step ST11. Meanwhile, when the time of the timer $T_3$ is not up, the procedure returns to the step ST9, and in the step ST9, the printer controller 12 carries out the sampling of the electric current value.

In the step ST11, the electric current value detected by the current detecting unit 32 in the step ST9 is input to the printer controller 12, and the current value is retained by the printer controller 12. Subsequently, the procedure proceeds to the step ST12. In the step ST12, the printer controller 12 causes the transfer bias (i.e., the test voltage) to be turned off, and subsequently, the procedure proceeds to the step ST13. In the step ST13, the printer controller 12 starts a timer $T_4$, and the procedure proceeds to the step ST14. In the step ST14, the printer controller 12 determines whether or not time of the timer $T_4$ is up. The timer $T_4$ counts time in order to detect the timing at which a minus transfer bias (−) is turned on. In other words, when the time of the timer $T_4$ is up, the procedure proceeds to the step ST15. In the step ST15, the printer controller 12 causes the minus transfer bias (−) to be turned on, and subsequently, the procedure proceeds to the step ST16.

In the step ST16, the printer controller 12 starts a timer $T_5$, and the procedure proceeds to the step ST17. In the step ST17, the printer controller 12 determines whether or not time of the timer $T_5$ is up. The timer $T_5$ is provided for managing a period of time for which the minus transfer bias (−) for cleaning the transfer roller 21 is being in an ON state. Accordingly, when the time of the timer $T_5$ is up, the procedure proceeds to the step ST18, and in the step ST18, the transfer bias is turned off. Subsequently, the procedure proceeds to the step ST19.

In the step ST19, the printer controller 12 determines whether or not time of the timer $T_6$ is up. If the time of the timer $T_6$ is up, the procedure proceeds to the step ST20. Meanwhile, if the time of the timer $T_6$ is not up, the printer controller 12 awaits until the time of the timer $T_6$ becomes up. In the step ST20, the printer controller 12 determines whether or not the warm-up of the fuser is completed, i.e., whether or not the temperature of the fuser is sufficiently raised. If it is determined that the warm-up of the fuser is completed, the procedure proceeds to the step ST21. In the step ST21, the print controller 12 turns on the paper feed clutch 42, and subsequently, the procedure proceeds to the step ST22. In the step ST22, the printer controller 12 starts a timer $T_7$, and the procedure proceeds to the step ST23. In the step ST23, the printer controller 12 determines whether or not the PSS 30 is turned on. Subsequently, in the step ST23, the printer controller determines whether or not the PSS is turned on. If in the step ST23, it is determined that the PSS is not turned on, the procedure proceeds to the step ST 24. Meanwhile, if in the sep ST23, it is determined that the PSS is turned on, i.e., it is determined that the paper supply is detected, the procedure proceeds to the step ST27.

In the step ST24, the printer controller 12 determines whether or not time of the timer $T_7$ is up. The timer $T_7$ is provided for managing a period of time in which it is detected whether or not the PSS 30 is turned on. Therefore, if it is determined that the time of the timer $T_7$ is not up, the procedure returns to the step ST23, and judgment of whether or not the PSS 30 is turned on is repeated. Meanwhile, if it is determined that the time of the timer $T_7$ is up, the procedure proceeds to the step ST25. In the step ST25, the printer controller 12 turns off the motor 41, the bias of the charging bias applying circuit 15, the bias of the developer bias applying circuit 20, and the memory removal brush 26, and the procedure proceeds to the step ST26. In the step ST26, the paper jam is displayed because the paper supply has not been detected up to this time, and the procedure is terminated.

On the other hand, in the step ST27, the printer controller 12 starts a timer $T_8$, a timer $T_9$, and a timer $T_{10}$. After that, the actual print process is started, and the procedure proceeds to the step ST28. In the step ST28, the printer controller 12 determines whether or not time of the timer $T_8$ is up. The timer $T_8$ is provide for managing a period of time which is a period from the time the PSS 30 is turned on to the time light exposure is started by the LED print head. In other words, when the time of the timer $T_8$ is up, the procedure proceeds to the step ST29, and in the step ST29, the printer controller determines a length of time for which the strobe signal will be being applied, based on the electric current value which has been detected when the test voltage is applied to the transfer roller, and which is stored in the printer controller 12.

As illustrated in the time chart of each signal for the LED print head of FIG. 7, when the electric current value is low because a temperature and humidity are low, or when the electric current value is high because a temperature and humidity are high, the period Tsi for which the signal STR1 is in an ON state is determined to be longer. On the other hand, when the electric current value is medium because a temperature and humidity are normal or medium, the period Tsi for which the signal STR1 is in an ON state is determined to be shorter. After the process of the step ST29 is performed, the procedure proceeds to the step ST30. In the step ST30, the printer controller 12 causes the light exposure for forming an electrostatic latent image to be started, based on a determined horizontal synchronization signal HSYNC. Subsequently, the procedure proceeds to the step ST31.

In the step ST31, the printer controller 12 determines whether or not time of the timer $T_9$ is up. The timer $T_9$ carries out counting of time from the time the PSS 30 is turned on to the time a pre-transfer bias is applied to the transfer roller 21. In other words, when it is determined that the time of timer $T_9$ is up, the procedure proceeds to the step ST32, and in the step ST32, the pre-transfer bias is applied to the transfer roller 21. Subsequently, the procedure proceeds to the step ST33. In the step ST33, the printer controller determines whether or not time of the timer $T_{10}$ is up. The timer $T_{10}$ carries out counting of time from the time the PSS 30 is turned on to the time a transfer bias is determined and applied to the transfer roller 21. Accordingly, when the time of timer $T_{10}$ is up, the procedure proceeds to the step ST34, and in the step ST34, the printer controller 12 applies the table 12a for determining a transfer bias to the electric current value detected at the time the test transfer voltage is applied to the transfer roller 21 so as to determine the transfer bias. Subsequently, the procedure proceeds to the step ST35, and in the step ST35, the printer controller causes the determined transfer bias to be applied to the transfer roller 21. The printing processes to be carried out by the LED print head 16 follows the application of the determined transfer bias.

In the above preferred embodiment of the present invention, the length of the strobe signal STR is determined based on the electric current value detected when the test voltage is applied to the transfer roller. However, the present invention is not limited to this case, and as another embodiment, a voltage control circuit 35 may be provided in the LED print head circuit as illustrated in FIG. 3, and a voltage value to be applied to the LED arrays may be determined based on the electric current value detected when the test voltage is applied to the transfer roller 21. In other words, when the current value is large because a temperature and humidity are high, the voltage value to be applied to the LED arrays is made large, and when the electric current value is small because a temperature and humidity are low, the voltage value to be applied to the LED arrays is made large. Furthermore, when a temperature and humidity are medium or normal, the voltage value to be applied to the LED arrays is made small.

What is claimed is:

1. An image forming apparatus comprising:
an image bearing body;
an exposure unit for exposing the image bearing body to light so as to form an electrostatic latent image on the image bearing body;
a developer for developing the electrostatic latent image on the image bearing body;
a transferring member for transferring the developed image on the image bearing body to a recording medium; and
a control unit for determining a transfer bias to be applied to the transferring member, based on an electric current value generated at the time a test voltage is applied to the transferring member, and controlling exposure energy of the exposure unit, based on said electric current value, wherein when said electric current value is low or high, the control unit causes the exposure energy to be large.

2. The image forming apparatus according to claim 1, wherein the exposure unit includes a light emitting diode array, and the control unit controls the exposure energy by controlling a strobe period of time of the light emitting diode array.

3. The image forming apparatus according to claim 1, further comprising:
a transfer bias applying unit for applying the test voltage and the transfer bias to the transferring member; and
a current detecting unit for detecting said electric current value generated at the time the test voltage is applied to the transferring member.

4. The image forming apparatus according to claim 3, wherein the control unit includes a table for determining the exposure energy, based on said electric current value detected by the current detecting unit.

5. The image forming apparatus according to claim 1, wherein the image forming apparatus possesses a facsimile function, and the exposure unit exposes the image bearing body to light, based on image information of facsimile image data received by the facsimile function, so as to form the electrostatic latent image corresponding to the image information.

6. The image forming apparatus according to claim 1, further including a scanner for scanning image data of an original, wherein the exposure unit exposes the image bearing body to light, based on image information of the scanned image data, so as to form the electrostatic latent image corresponding to the image information.

7. The image farming apparatus according to claim 1, wherein the image forming apparatus possesses a facsimile function, and includes a scanner for scanning image data of an original, and the exposure unit exposes the image bearing body to light, based on image information of facsimile image data received by the facsimile function or the scanned image data, so as to form the electrostatic latent image corresponding to the image information.

8. The image forming apparatus according to claim 7 further including a printer interface for receiving image data from a personal computer, wherein the exposure unit exposes the image bearing body to light, based on image information of the image data received from the personal computer, so as to form the electrostatic latent image corresponding to the image information of the image data received from the personal computer.

9. The image forming apparatus according to claim 1, further including a printer interface for receiving image data from a personal computer, wherein the exposure unit exposes the image bearing body to light, based on image information of the image data received from the personal computer, so as to form the electrostatic latent image corresponding to the image information.

10. An image forming method, comprising:
   a) applying a test voltage to a transferring member contacting with an image bearing body, and detecting an electric current value generated at the time the test voltage is applied to the transferring member;
   b) determining exposure energy to be used for exposing the image bearing body to light, and a transfer bias to be applied to the transferring member, based on the detected electric current value, wherein when the detected electric current value is low or high, the exposure energy is determined to be large;
   c) forming an electrostatic latent image on the image bearing body by using the determined exposure energy;
   d) developing the electrostatic latent image on the image bearing body; and
   e) transferring the developed image to a recording medium by applying the determined transfer bias to the transferring member.

11. The image forming method according to claim 10, wherein the exposure energy is controlled by controlling a period of time for which the image bearing body will be being exposed to light.

12. The image forming method according to claim 11, wherein when the detected electric current value is low or high, the period of time is controlled to be long.

13. The image forming method according to claim 10, wherein the exposure energy is controlled by controlling intensity of light to be used for exposing the image bearing body.

14. The image forming method according to claim 13, wherein when the detected electric current value is low or high, the intensity of light is controlled to be large.

15. An image forming apparatus, comprising:
   an image bearing body;
   an exposure unit for exposing the image bearing body to light so as to form an electrostatic latent image on the image bearing body;
   a developer for developing the electrostatic latent image on the image bearing body;
   a transferring member for transferring the developed image on the image bearing body to a recording medium; and
   a control unit for determining a transfer bias to be applied to the transferring member, based on an electric current value generated at the time a test voltage is applied to the transferring member, and controlling exposure energy of the exposure unit, based on said electric current value,
   wherein the exposure unit includes a light emitting diode array, and the control unit controls the exposure energy by controlling a strobe period of time of the light emitting diode array, and wherein when said electric current value is low or high, the control unit causes the exposure energy to be large.

16. The image forming apparatus according to claim 15, further comprising:
   a transfer bias applying unit for applying the test voltage and the transfer bias to the transferring member; and
   a current detecting unit for detecting said electric current value generated at the time the test voltage is applied to the transferring member.

17. The image forming apparatus according to claim 16, wherein the control unit includes a table for determining the exposure energy, based on said electric current value detected by the current detecting unit.

18. The image forming apparatus according to claim 15, wherein the image forming apparatus possesses a facsimile function, and the exposure unit exposes the image bearing body to light, based on image information of facsimile image data received by the facsimile function, so as to form the electrostatic latent image corresponding to the image information.

19. The image forming apparatus according to claim 15, further including a scanner for scanning image data of an original, wherein the exposure unit exposes the image bearing body to light, based on image information of the scanned image data, so as to form the electrostatic latent image corresponding to the image information.

20. The image forming apparatus according to claim 15, wherein the image forming apparatus possesses a facsimile function, and includes a scanner for scanning image data of an original, and the exposure unit exposes the image bearing body to light, based on image information of facsimile image data received by the facsimile function or the scanned image data, so as to form the electrostatic latent image corresponding to the image information.

21. The image forming apparatus according to claim 20, farther including a printer interface for receiving image data from a personal computer, wherein the exposure unit exposes the image bearing body to light, based on image information of the image data received from the personal computer, so as to form the electrostatic latent image corresponding to the image information of the image data received from the personal computer.

22. The image forming apparatus according to claim 15, further including a printer interface for receiving image data from a personal computer, wherein the exposure unit exposes the image bearing body to light, based on image information of the image data received from the personal computer, so as to form the electrostatic latent image corresponding to the image information.

23. An image forming apparatus, comprising:
   an image bearing body;
   an exposure unit for exposing the image bearing body to light so as to form an electrostatic latent image on the image bearing body;
   a developer for developing the electrostatic latent image on the image bearing body;
   a transferring member for transferring the developed image on the image bearing body to a recording medium; and a control unit for determining a transfer bias to be applied to the transferring member, based on an electric current value generated at the time a test voltage is applied to the transferring member, and controlling exposure energy of the exposure unit, based on said electric current value, wherein the exposure unit includes a light emitting diode array, and the control unit controls the exposure energy by controlling a voltage to be applied to the light emitting diode array, and wherein when said electric current value is low or high, the voltage to be applied to the light emitting diode array is caused to be large by the control unit.

24. The image forming apparatus according to claim 23, further comprising:

a transfer bias applying unit for applying the test voltage and the transfer bias to the transferring member; and a current detecting unit for detecting said electric current value generated at the time the test voltage is applied to the transferring member.

25. The image forming apparatus according to claim 24, wherein the control unit includes a table for determining the exposure energy, based on said electric current value detected by the current detecting unit.

26. The image forming apparatus according to claim 23, wherein the image forming apparatus possesses a facsimile function, and the exposure unit exposes the image bearing body to light, based on image information of facsimile image data received by the facsimile function, so as to form the electrostatic latent image corresponding to the image information.

27. The image forming apparatus according to claim 23, further including a scanner for scanning image data of an original, wherein the exposure unit exposes the image bearing body to light, based on image information of the scanned image data, so as to form the electrostatic latent image corresponding to the image information.

28. The image forming apparatus according to claim 23, wherein the image forming apparatus possesses a facsimile function, and includes a scanner for scanning image data of an original, and the exposure unit exposes the image bearing body to light, based on image information of facsimile image data received by the facsimile function or the scanned image data, so as to form the electrostatic latent image corresponding to the image information.

29. The image forming apparatus according to claim 28, further including a printer interface for receiving image data from a personal computer, wherein the exposure unit exposes the image bearing body to light, based on image information of the image data received from the personal computer, so as to form the electrostatic latent image corresponding to the image information of the image data received from the personal computer.

30. The image forming apparatus according to claim 23, further including a printer interface for receiving image data from a personal computer, wherein the exposure unit exposes the image bearing body to light, based on image information of the image data received from the personal computer, so as to form the electrostatic latent image corresponding to the image information.

31. An image forming apparatus, comprising:

an image bearing body;

an exposure unit for exposing the image bearing body to light so as to form an electrostatic latent image on the image bearing body;

a developer for developing the electrostatic latent image on the image bearing body;

a transferring member for transferring the developed image on the image bearing body to a recording medium; and a control unit for determining a transfer bias to be applied to the transferring member, based on an electric current value generated at the time a test voltage is applied to the transferring member, and controlling exposure energy of the exposure unit, based on said electric current value, wherein the exposure unit includes a light emitting diode array, and the control unit controls the exposure energy by controlling a voltage to be applied to the light emitting diode array, and wherein when said electric current value is medium, the voltage to be applied to the light emitting diode array is caused to be small by the control unit.

32. The image forming apparatus according to claim 31, further comprising:

a transfer bias applying unit for applying the test voltage and the transfer bias to the transferring member; and a current detecting unit for detecting said electric current value generated at the time the test voltage is applied to the transferring member.

33. The image forming apparatus according to claim 32, wherein the control unit includes a table for determining the exposure energy, based on said electric current value detected by the current detecting unit.

34. The image forming apparatus according to claim 31, wherein the image forming apparatus possesses a facsimile function, and the exposure unit exposes the image bearing body to light, based on image information of facsimile image data received by the facsimile function, so as to form the electrostatic latent image corresponding to the image information.

35. The image forming apparatus according to claim 31, further including a scanner for scanning image data of an original, wherein the exposure unit exposes the image bearing body to light, based on image information of the scanned image data, so as to form the electrostatic latent image corresponding to the image information.

36. The image forming apparatus according to claim 31, wherein the image forming apparatus possesses a facsimile function, and includes a scanner for scanning image data of an original, and the exposure unit exposes the image bearing body to light, based on image information of facsimile image data received by the facsimile function or the scanned image data, so as to form the electrostatic latent image corresponding to the image information.

37. The image forming apparatus according to claim 36 further including a printer interface for receiving image data from a personal computer, wherein the exposure unit exposes the image bearing body to light, based on image information of the image data received from the personal computer, so as to form the electrostatic latent image corresponding to the image information of the image data received from the personal computer.

38. The image forming apparatus according to claim 31, further including a printer interface for receiving image data from a personal computer, wherein the exposure unit exposes the image bearing body to light based on image information of the image data received from the personal computer, so as to form the electrostatic latent image corresponding to the image information.

* * * * *